(12) United States Patent
Pietikainen et al.

(10) Patent No.: US 10,091,185 B2
(45) Date of Patent: Oct. 2, 2018

(54) METHOD AND SYSTEM FOR MANAGING DATA

(75) Inventors: Ilkka Pietikainen, Espoo (FI); Harri Yli-Kujala, Helsinki (FI)

(73) Assignee: FINNISH TECHNOLOGY MANAGEMENT OY, Helsinki (FI)

( * ) Notice: Subject to any disclaimer, the term of this patent is extended or adjusted under 35 U.S.C. 154(b) by 1373 days.

(21) Appl. No.: 13/574,427

(22) PCT Filed: Jan. 21, 2011

(86) PCT No.: PCT/FI2011/000004
§ 371 (c)(1),
(2), (4) Date: Sep. 22, 2012

(87) PCT Pub. No.: WO2011/089307
PCT Pub. Date: Jul. 28, 2011

(65) Prior Publication Data
US 2016/0191497 A1 Jun. 30, 2016

(30) Foreign Application Priority Data
Jan. 21, 2010 (FI) .................................... 20105050

(51) Int. Cl.
*H04L 29/06* (2006.01)
(52) U.S. Cl.
CPC ........ *H04L 63/0815* (2013.01); *H04L 63/083* (2013.01)
(58) Field of Classification Search
None
See application file for complete search history.

(56) References Cited

U.S. PATENT DOCUMENTS

| 7,783,900 | B2 * | 8/2010 | Hacigumus | G06F 17/30471 380/279 |
| 8,117,648 | B2 * | 2/2012 | Slaton | H04L 63/083 707/608 |
| 2002/0159601 | A1 * | 10/2002 | Bushmitch | H04L 29/06 380/277 |
| 2005/0177731 | A1 | 8/2005 | Torres et al. | |
| 2006/0156026 | A1 * | 7/2006 | Utin | G06F 21/31 713/183 |

(Continued)

FOREIGN PATENT DOCUMENTS

WO 2008098710 8/2008

OTHER PUBLICATIONS

Jammalamadaka R C et al: "Pvalult : A Client Server System Providing Mobile Access to Personal Data," ACM, 2 Penn Plaza, Suite 701, New York, USA, 2005, XP040032249.

(Continued)

*Primary Examiner* — Michael R Vaughan
(74) *Attorney, Agent, or Firm* — Thompson Hine LLP (57) ABSTRACT

The system has a user terminal. A client provides access for the user terminal to data entries stored in a database. A database holds information consisting of one or more data entries and data identifications connected to the data entries. The client forms data identification for a certain data entry to be stored in the database from a unique user name and a master password. A pair of the data identification and the data entry is stored. Access for the user terminal is provided to a data entry stored in a database by using the master password, and the unique user name.

32 Claims, 5 Drawing Sheets (56) References Cited

U.S. PATENT DOCUMENTS

| | | | | |
|---|---|---|---|---|
| 2007/0101401 A1* | 5/2007 | Genty | ............... | H04L 63/0442 |
| | | | | 726/3 |
| 2011/0055585 A1* | 3/2011 | Lee | ..................... | H04L 9/0844 |
| | | | | 713/183 |
| 2011/0131415 A1* | 6/2011 | Schneider | ............ | H04L 9/3226 |
| | | | | 713/171 |
| 2015/0304297 A1* | 10/2015 | Slaton | ................. | H04L 63/083 |
| | | | | 726/5 |
| 2016/0149873 A1* | 5/2016 | Dickinson | .......... | H04L 63/0435 |
| | | | | 713/171 |

OTHER PUBLICATIONS

Schneier: "Cryptographic Protection of Databases," Applied Cryptography, XX, XX, Jan. 1, 1996, pp. 73-74, XP002958299.

* cited by examiner

METHOD AND SYSTEM FOR MANAGING DATA

PRIOR APPLICATIONS

This is a U.S. national phase patent application that claims priority from PCT/FI2011/000004 filed 21 Jan. 2011, that claims priority from Finnish Patent Application No. 20105050, filed 21 Jan. 2010.

TECHNICAL FIELD

The invention is concerned with a system and method for managing data in a communication network, especially for managing confidential information.

BACKGROUND AND SUMMARY OF THE INVENTION

A password is a secret word or string of characters that is used for authentication, to prove identity or gain access to a resource or service. For example an access code is a type of password. The password should be kept secret from those not allowed access.

User names and passwords are commonly used by people during a log in process that controls access to protected computer operating systems, mobile phones, cable TV decoders, automated teller machines (ATMs), etc. A typical computer user may require passwords for many purposes: logging in to computer accounts, retrieving e-mail from servers, accessing programs, databases, networks, web sites, and even reading the morning newspaper online.

Passwords or passcodes can consist of words, numbers, different characters or they can be combinations of those or they can e.g. be formed from multiple words. Purely numeric passcodes, such as the Personal Identification Numbers (PINs) are commonly used for ATM access.

Passwords and PINs are also used for e.g. credit cards, Bank account, mobile's pin, Facebook, Twitter, LinkedIn. Additional authentication technologies, which are typically used along with a password or PIN are e.g. biometrics, smart cards and tokens.

Passwords have significant disadvantages. They may be stolen, spoofed, forgotten, a hacker or other third party can get access to them etc. Passwords are generally short enough to be easily memorized and typed or they are otherwise easy to remember. The most common passwords are forenames and other easy to remember passwords. This fact increases the risk of becoming attacked by a third party.

Many users have solved the "how to remember" issue simply using the same password everywhere. The password itself may be strong enough but using the same password everywhere makes a third party easy to break into a service if one password is revealed. This is one of the most common methods to solve the password issue today.

It is also very common that users simply save their passwords in clear text everywhere, such as on Post-it stickers on their desk.

The easier a password is for the owner to remember, the easier it will generally be for a hacker to guess. Passwords which are difficult to remember (such as passwords with a requirement to have a mix of uppercase and lowercase letters and digits or the requirement to change it monthly) will again reduce the security of a system because users might need to write them down or electronically store the password.

Some computer systems store user passwords as cleartext, against which to compare user log on attempts. If an attacker gains access to such an internal password store, all passwords—and so all user accounts—will be compromised.

More secure systems store each password in a cryptographically protected form, so access to the actual password will still be difficult for a snooper who gains internal access to the system, while validation of user access attempts remains possible.

A common approach stores only a "hashed" form of the plaintext password. When a user types in a password on such a system, the password handling software runs through a cryptographic hash algorithm, and if the hash value generated from the user's entry matches the hash stored in the password database, the user is permitted access.

Thus, users have too many passwords to be able to manage them securely. Each password may expire on a different schedule, and be subject to different rules about password composition and reuse.

Some systems are able to force users to select hard-to-guess passwords, while others are not. Some systems require that users change their passwords periodically, while others cannot enforce expiration.

Users have trouble remembering passwords, because they are too complicated to remember, they have too many of them or because they chose a new password at the end of the day or week, and did not use it of the enough to be able to remember it.

These problems drive users to choose trivial passwords, to avoid changing their passwords and to write down their passwords. All of these behaviors can compromise network security.

When users do comply with policy and regularly change their passwords to new, hard-to-guess values, they tend to forget their passwords and must call the help desk. Password and login problems are the top incident type at most IT help desks.

Since passwords can not be avoided for the time being, they remain difficult for users to manage and thus solutions are needed to help users more effectively manage their passwords.

There are attempts to solve this problem. Some of those known prior art systems for managing passwords are now described.

One solution is to save the password in a browser that supports "save your password" or "Remember me" functionality. This is an easy solution for a user but not safe since a hacker can easily find out the password from a browser. Whenever a password is saved into a browser (ultimately into the device's hard disk/memory) or in a separate document/file/device, the user takes a security risk. One may lose the document or the device or one may have formatted the computer (for example while updating the Operating System) and loose all content at that moment, including the passwords. Saving the password into the browser is all but safe. Passwords saved into the browser are not encrypted and even if they were, a third party getting hands on your computer (or by using remote virus programs) has all the passwords in use and therefore an access to all services of the user. Even if passwords are encrypted into the device/file, it is risky because the encryption may be reversed especially if the encryption is not strong enough. Having the passwords encrypted is problematic in the sense that not all devices support the encryption functionality used and even if they do, the encrypted password file may be corrupted and becomes not accessible.

Another major issue for the user using the "save your password" functionality is the fact that sooner or later the user changes to a new device. Once that happens, all passwords saved into the device need to be copied into the new device. As long as the user still has access to the old device, the transfer of passwords is manageable though annoying. But if the device gets broken or the file where passwords are saved gets corrupted, one may not be able to transfer the passwords at all.

Still one problem is that most if not all services require an email address when registering into the service. The email address is used for many purposes but as well for the purpose when the user forgets its password. If so, the administrator can send the password or a new one to the users email account and then the user may access the service again. A problem arise when the user has changed his email address and has no longer access to the old e-mail account. In that case the administrator cannot send the password (or the new password) to the user and the user has to contact the administrator by other means, which is time consuming and cumbersome.

Accessing a service from a public device (such as a library computer or similar) is especially difficult if not impossible if the user does not remember the password. It is either not safe for the user to bring the passwords with him/her.

Another issue is the access itself. It happens often that a user saves the password into the device (involuntarily) while being in a public network/device. In those cases the next user may access the service due to the fact that the previous user of the device saved the password. If the user has different passwords to all services it is very difficult to remember those secret passwords while accessing services from a public device.

There is an increasing number of different devices per user. Today many people have at least a laptop computer and a smart phone with them all the time especially when travelling. It is relatively easy to lose a smart phone or laptop in an airport or a café. A lost device causes a lot of problems for the user. The password issue is one of the most serious one since the user may have saved the passwords in the device and a third party that founds the device may access the services. And if the passwords are saved only in the device the user has to use "Forgot your password" functionality and recover all passwords to the new device.

The increasing number of devices per user brings another issue. If the user is using the "Save your password" functionality of the browser, the password is saved into that particular device. The user has to copy that password into the other device in order to access the same services with the other device. Later on, when the password of a service is changed, the new password has to be copied into the other device as well. This administration of the passwords becomes more difficult the more there are devices and services.

Some well known password systems require external devices (for example tokens) to be used when generating the password. And if the external device is lost or gets broken, the user may not have an access to the service at all before getting a new device.

Bank accounts are obviously one of the most secured services. Password systems vary from country to country a bit, but most of the password systems used by banks require a password and separate one-time-keys in order to access. These one-time-keys are typically four to eight (4-8) digit numbers that the bank provides the user in a separate file (typically a small wallet-size leaflet). These one-time-keys are not as convenient as password only systems due to the fact that the user has to bring the one-time-keys with him/her. One-time-keys may be lost too and some users even write the password into the same one-time-key leaflet in order to remember it.

Banks tend to think that these one-time-keys together with the password is safer than the password only system. The password used together with the one-time-key is a number sequence. The one-time-keys may be used in a numbered order marked by the user (and controlled by the bank when accessing) or controlled by the bank only (bank suggesting the next number key to be used while accessing).

The issue for a user is that the user has to bring the one-time-keys with him/her in order to access. When the user brings printed one-time-keys with him/her that is a security risk especially when the password (used with the one-time-keys) is marked into the same leaflet.

The solution presented on the web site, pwsafe.org, is mentioned as prior art. It allows creating of a secured and encrypted user name/password list. The list is accessible with a single "Master Password" of the in order to unlock and access the entire user name/password list. The solution provides access to a structured password list stored in a database in the user's computer.

Another solution is presented on the web site www.x-marks.com. In this solution, a user can synchronize their bookmarks and passwords they are using on different machines. The passwords are stored in encrypted file that is stored on the service provider's computer. The service provider can, however, not access the passwords. Two passwords are needed, one to the service itself and then an additional one (a PIN) so that the service provider would know what encrypted file to give the user. In this xmarks service, the password file in the xmarks server can be mapped to a single user by the system administrator, whereby the service provider knows which data entries belong to a certain user. The xmarks service stores the passwords in plain text on the user's machine (and it uses browsers password cache) including the pin used to encrypt the passwords. This is problematic if the user's machine (being e.g. a laptop/PDA) is stolen or lost.

A third solution is presented on the web site en.wikipedia.org. The Single Sign-On (SSO) solutions allow users to access all services participating in SSO so that the user authentication (e.g. a password request) is only done once. These solutions require that there is an authentication server that provides security tokens for a client that should be passed to the service provider when the service is accessed. From the security token the service can verify that the client has been successfully authenticated. The database does not know who is using the service or cannot identify entries for a certain user of the database. The services must be integrated to the system and there is a single entity doing the authentication, which is always done locally on the client machine.

WO publication 2008/098710 discloses method for managing passwords and particularly of supporting registration and authentication of user operating a user terminal to a password server system. A service site ID (and/or a service site password) and a master password are specified at the user terminal. A message comprising at least the ID and the master password and an encrypted key file message is sent to the password server system. A key file entry is then stored at the password server system comprising the first message and the server user ID. In this solution the password server system has no direct access to the key files by the users since they are encrypted by the user but the access process is controlled by the password server system, which makes the user dependent on relying on it.

The object of this invention is to provide a solution with which a user can manage his data easily and safe by avoiding the prior art problems described above.

The invention is concerned with a system for managing data in a communications network comprising one or more user terminals, a client acting in said user terminal(s) by providing access for said user terminal(s) to data entries stored in a database and, a database holding information consisting of one or more data entries and data identifications connected to the data entries. The client has means for forming a data identification for a certain data entry to be stored in the database from a unique user name and a master password, storing a pair of the data identification and the data entry, and for providing access for said user terminal(s) to a data entry stored in a database by using the master password, and the unique user name.

The invention is also concerned with a client program having the means mentioned.

Furthermore, the invention is concerned with a method for managing data in such a communications network. The method comprises the steps in which the user enters via a user terminal a unique user name, a master password and a data entry to be stored in the data base, the client forms a data identification of the unique user name and the master password and stores the pair of the data identification and the data entry in the database. The client provides access for said user terminal to the data entry stored in the database by using the master password and the unique user name.

In a further embodiment data identification for the data entry is in addition is formed from reference information to a data entry, whereby the means for providing the access use the master password, the unique user name and the reference information to the data entry.

The client can furthermore has means for forming an identification for password validation related to the unique user name, the master password and reference information to the master password, with which master password data entries can be stored and fetched from the database, and means for storing a pair of the identification for password validation and a password code, and means for fetching the master password code from the database by means of the identification for password validation in order to validate the master password.

The system is preferably in a public communication network, e.g. the internet, and the database is held by a public server in the public communication network.

The unique user name is usually an e-mail address of the user.

When there is only one data entry stored in the database, the data entry can easily be found from the database by means of such a data identification for the data entry that is formed only from the unique user name and the master password. But when there are more than one data entry, the data identification has to be unique for each data entry. This is solved by forming the data identification for the data entry not only from the unique user name and the master password but also from some reference information to the data entry in question. Of course, reference information to the data entry can be used to form the data identification even if there would be only one data entry stored.

When the user uses the client for the first time, a master password is entered with which master password data entries can be stored in the data base and fetched from the data base. In practice, each time the user opens the client, the master password has to be entered once so that the user would have the right to use the services offered by the client. The client forms an identification for password validation, the data identification being related to at least the unique user name, the master password and reference information to the master password and then stores a pair of the identification for password validation and the master password or a master password code. The code can e.g. be a hash of the master password or something else that the password can be derived from. In this text, the term master password code is intended to cover the password in clear text as well. Each time the user opens the client, the master password entered is validated by the client by fetching the master password code from the database by means of the data identification for password validation. If the data entry contains the master password in clear text, then the entered master password is validated upon match with the master password in the data entry that is related to data identification for password validation. If the data entry instead of being the master password in clear text is some code to the master password, for example a hash of the master password, then the client first has to form a hash of the master password entered by the user, and thereafter check if they match.

An important feature in the invention is also that the client encrypts the data entries before storing them in the database and decrypts the data entries after having fetched them from the database. Encryption and decryption can also be done for the master password or master password code stored. A symmetric encryption method is suitable for this purpose, such as AES 256. In cryptography, the Advanced Encryption Standard (AES) is an encryption standard adopted by the U.S. government. The AES ciphers are used worldwide, as was the case with its predecessor, the Data Encryption Standard (DES).

The invention provides several advantages and improvements in view of the prior art solutions. First, by means of the invention, the user can manage all his passwords and other secret data with a very user-friendly interface, since the user needs only one password to get access to all data needed. Secondly, the passwords and secret data can be accessed and stored in a secure way since the data is not stored in the user terminal, which can be stolen, and neither is the database, wherein the data is stored, administered by anyone else than the user. Only the user terminal has, thanks to the client therein, access to the data in the database. In the prior art solutions, the data is either stored in the user terminal or then the user terminal has to give its master password or other password to an external server. Moreover, only the user knows that, he has stored anything at all and what data is stored.

A further advantage is that, the client program can be downloaded for use to any terminal, which can be even a public computer, since the client can be downloaded per session and thereafter be removed from the computer.

The invention will now be described by means of some implementation examples by referring to figures to the details of which the invention is not restricted.

DETAILED DESCRIPTION

Figure 1:
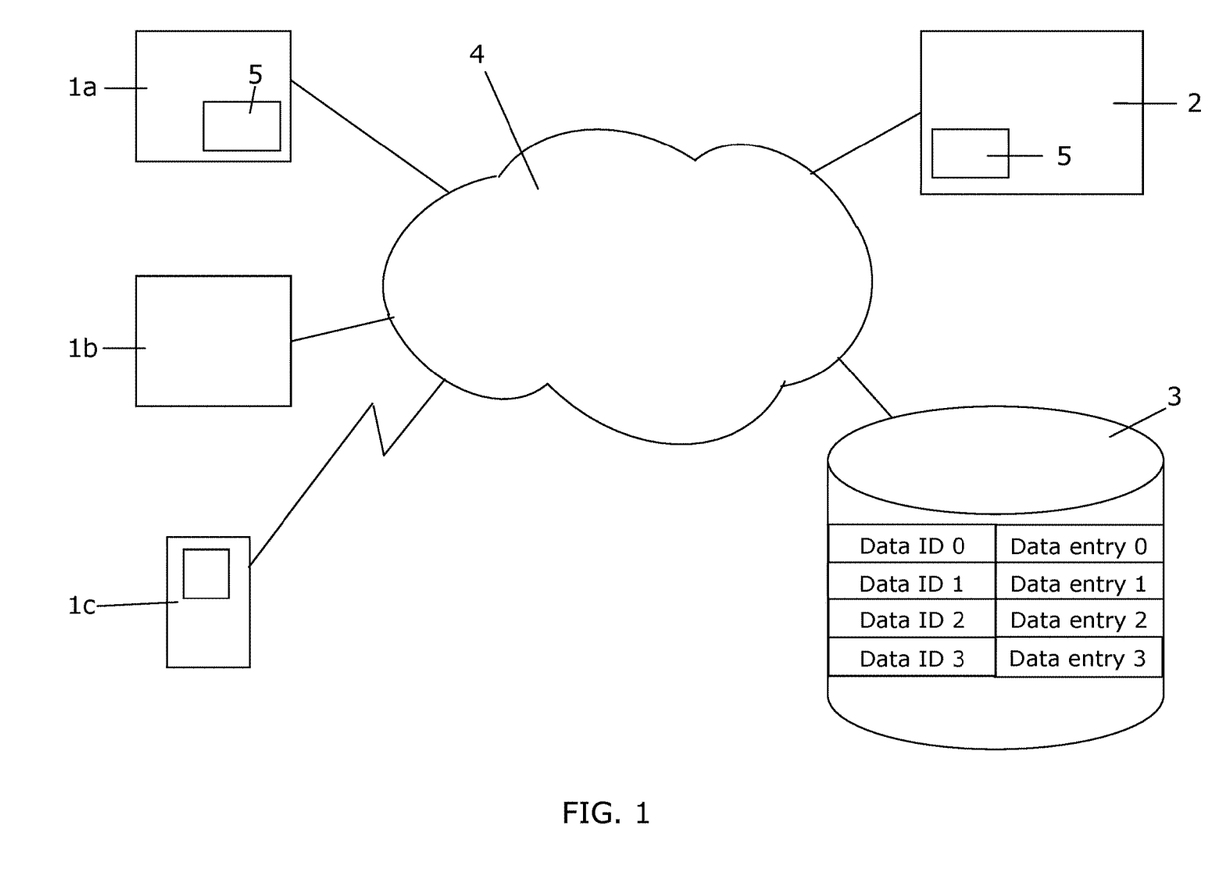
FIG. 1 is an architecture view of the environment in which the invention can be implemented

The system of the invention can e.g. be implemented in an environment of FIG. 1. A client program 5 provided by a service provider 2 provides access for user terminals 1a, 1b, 1c to information stored in a database 3 in a server in a communication network 4. Depending on implementation, the service provider is in another server than the database or in the same server. Of clarity reasons, only three user terminals 1a, 1b, 1c are shown in FIG. 1.

The client program 5 can be downloaded for use from the service provider 2 separately for each session to any such wired or wireless user terminal, e.g. a laptop, PC, mobile station, smart phone or television, which has access to the communication network 4. Alternatively, the client program 5 can be installed in the user terminal. Preferably, the client program, which can be downloaded partly or in the whole, is in the form of Java Script but other programs can also be used. JavaScript is an object-oriented scripting language used to enable programmatic access to objects within both the client application and other applications. It is primarily used in the form of client-side JavaScript, implemented as an integrated component of the web browser, allowing the development of enhanced user interfaces and dynamic websites.

The database 3 in the server holds information consisting of one or more pairs of data entries and data identifications connected to each other so that the data entry can be fetched from the database by means of the data identification. The information in the database 3 can be accessed by the user terminal 1a, 1b, 1c via the client program 5 by entering by the user of a master password giving access to the information.

The client program 5 is either downloaded for the use to the user terminal or it has been installed therein in advance. When the communication network 4 is a public network, like the internet, it is possible for the user to e.g. visit an internet café and download the client program 5 to a public computer therein for the use. After the use, the client program 5 can be deleted from the computer.

Figure 2:
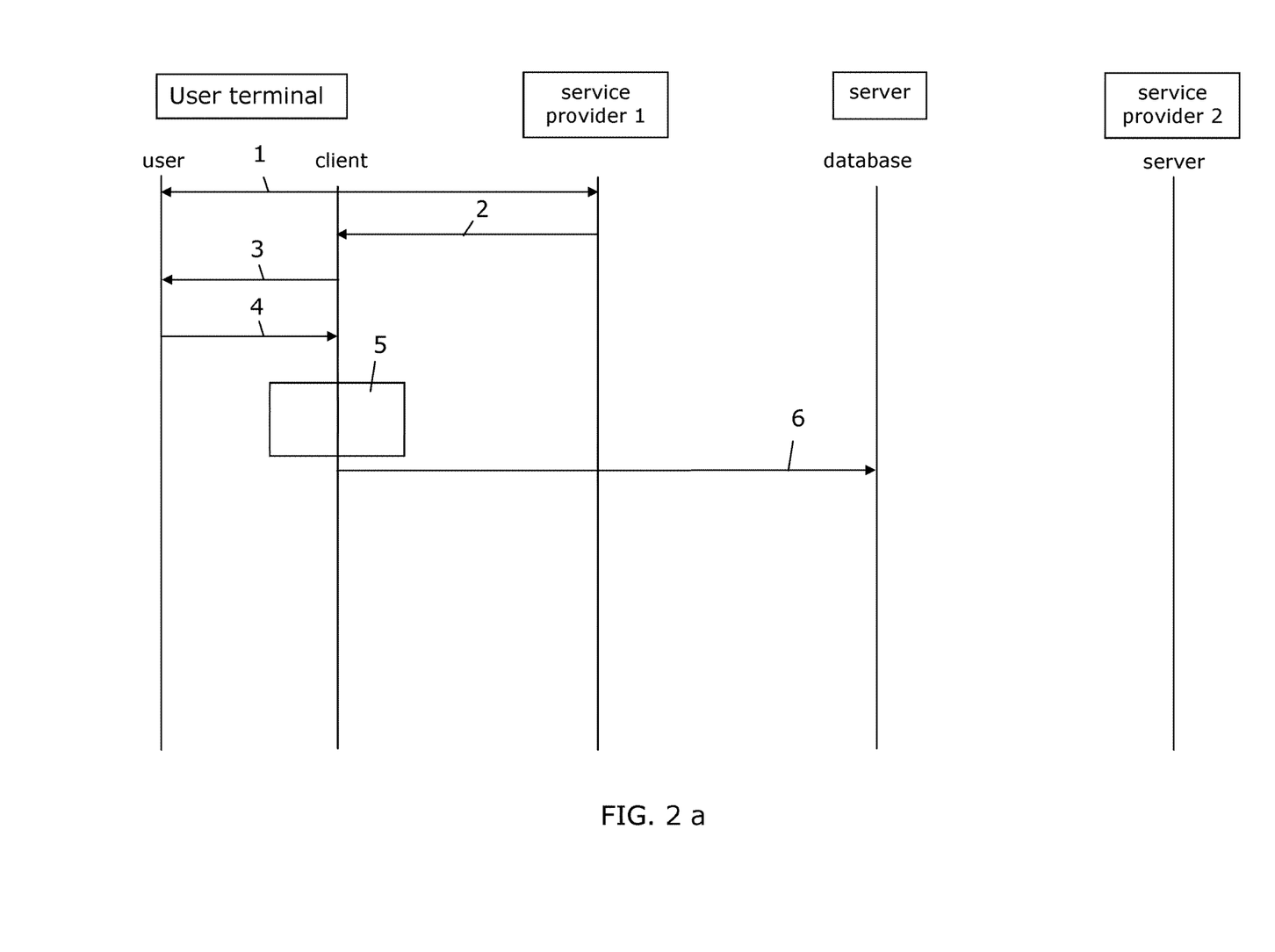
FIGS. 2a-2c is a signal diagram of a first embodiment of the method of the invention.

FIG. 2a is a signal diagram of a first part of the first embodiment of the method of the invention, wherein a master password, with which data entries can be stored and fetched from the data base is stored in the database. In this example it is assumed that the user does not yet have any client in the user terminal and wants to use a service with his personal computer (being here the user terminal). Thus, the user uses the client for the first time for managing his access to this service, the internet address of which can e.g. be of the form www.example.com. In the example of FIG. 2, www.example.com stands for a URL address that requires log-in information for the use of the service. In computing, a Uniform Resource Locator (URL) is a special example of the Uniform Resource Identifier (URI) that specifies where an identified resource is available and the mechanism for retrieving it. The URL is the best-known example of URI and is used as the address of a web page on the World Wide Web.

For using the client program, it first has to be in the user terminal. The client can either by installed in advance or be downloaded when intended to be used or before use. In the example of FIG. 2a, the user requests, in signal 1, the client to be downloaded to his user terminal by entering for the browser in the user terminal the web address of the service provider (service provider 2) providing the client program. The client is downloaded to the user terminal in signal 2 including instructions for how to proceed, which are presented for the user by signal 3 on the screen of the user terminal in the user interface of the client program.

In accordance with the instructions, the user now enters a unique user name and a log-in master password for the client in signal 4 following the first step of the instructions. This master password is a log-in password to the client, with which master password the user also later can get access to information stored.

In signal 5, the client then forms a data identification for password validation that is related to the unique user name and the master password by forming a hash of the unique user name, the master password and an identification to the master password (reference information to the master password). The unique user name is usually the e-mail address of the user. Preferably, the client also encrypts the master password.

A pair of the data identification for password validation and the encrypted master password is then stored by the client in the database in signal 6. In practice, the master password is not stored as such. Instead, usually a hash of the master password is stored or some other code to the master password. The encryption can be performed either to the master password itself or to the hash.

In this pair of data identification for password validation and the encrypted master password, the encrypted master password could be seen as kind of a data entry.

Figure 2B:
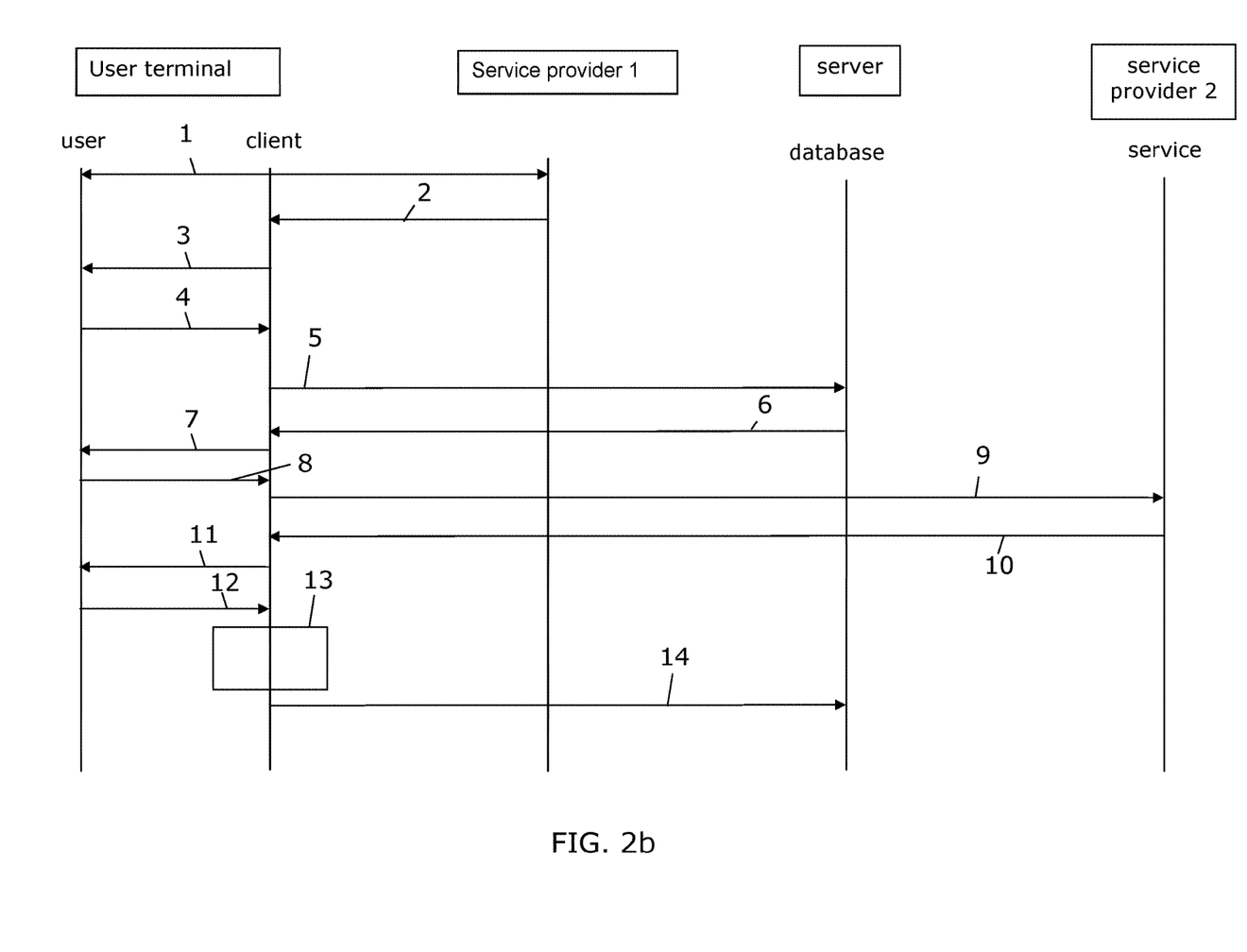

The user could now directly continue by storing a data entry in the data base via the client and optionally to use a service, but now, in FIG. 2b, it is assumed that the user interrupts the use of the client and therefore has to log-in again to use the client for storing his data entry and also enter the master password again since the client was shut off therebetween.

FIG. 2b is a signal diagram of the second part of the first embodiment of the method of the invention, wherein the user uses the client for storing a data entry in the data base. Thus, it is assumed that the user already has used the client earlier in a way in accordance with FIG. 2a. Now, he, however, uses a public computer to attend the example-service.

Signals 1-4 of FIG. 2b are the same as in FIG. 2a. Thus, the user requests, in signal 1, the client to be downloaded to his user terminal by entering for the browser in the user terminal the web address of the service provider (service provider 2) providing the client program. The client is downloaded to the user terminal in signal 2 including instructions for how to proceed, which are presented for the user by signal 3 on the screen of the user terminal in the user interface of the client program.

In accordance with the instructions, the user now enters a unique user name and a log-in master password for the client in signal 4 following the first step of the instructions. This master password is a log-in password to the client, with which master password the user also later can get access to information stored.

If the user would have used his own computer with the client already being in the user terminal, signals 1-3 would not have been necessary, and the user could just have continued with signal 4 after that the user interface of the client program had been opened.

Because of the actions performed, the client can validate the master password entered by signal 4, which is done with signals 5 and 6 of FIG. 2b. In signals 5 and 6, the client fetches the encrypted master password code from the database by means of the data identification for password validation, and derives the master password from the master password code and decrypts the encrypted master password or master password code. The entered master password is validated upon match with the master password in the data entry.

In accordance with the second step of the instructions presented on the screen for the user by signal 7, the user of the user terminal now enters a web address to a service to be used, for instance www.example.com, thereby requesting for the example-service by signals 8 and 9 (the client forwards the request).

In signals 10 and 11, the example-service asks for log-in information, which is entered by the user. The interaction between the user and the example-service now continues independently of the client and this is not shown in FIG. 2b.

Information of the entering of the log-in password to the example-service goes to the client in signal 12.

In step 13, the client constructs a data identification for the log-in password so that this data entry can be found. This data identification is formed by constructing a hash of the master password, the reference information to the log-in password to the example-service and of the e-mail address of the user. The reference data is preferably the web address to the service, i.e. www.example.com, whereby no separate reference information to the service needs to be entered. The log-in information to the example-service forms the data entry that now is to be stored in the database. The client encrypts the data entry by e.g. AES 256 or other encryption method.

The client then stores, by signal 14, the pair of the data identification and the encrypted data entry in a database.

As long the user keeps the client open, other services can be accessed with this same master password entering and more data entries can be stored in the database.

FIG. 2c is a signal diagram of the third part of the first embodiment of the method of the invention, wherein the user uses the client for fetching a data entry in the data base. Thus, it is assumed that the user already has used the client earlier in a way in accordance with FIGS. 2b-2c. Now, he, however, uses a public computer to attend the example-service.

Signals 1-7 of FIG. 2c are the same as in FIG. 2b.

Thus, the user requests, in signal 1, the client to be downloaded to his user terminal by entering for the browser in the user terminal the web address of the service provider (service provider 2) providing the client program. The client is downloaded to the user terminal in signal 2 including instructions for how to proceed, which are presented for the user by signal 3 on the screen of the user terminal in the user interface of the client program.

In accordance with the instructions, the user now enters a unique user name and a log-in master password for the client in signal 4 following the first step of the instructions. This master password is a log-in password to the client, with which master password the user also later can get acess to information stored.

If the user would have used his own computer with the client already being in the user terminal, signals 1-3 would not have been necessary, and the user could just have continued with signal 4 after that the user interface of the client program had been opened.

Because of the actions performed, the client can validate the master password entered by signal 4, which is done with signals 5 and 6. In signals 5 and 6, the client fetches the encrypted master password code from the database by means of the data identification for password validation, and derives the master password from the master password code and decrypts the encrypted master password or master password code. The entered master password is validated upon match with the master password in the data entry.

In accordance with the second step of the instructions presented on the screen for the user by signal 7, the user of the user terminal now enters a web address to a service to be used, for instance www.example.com.

When the user of the user terminal now enters a web address to the service to be used, e.g. www.example.com, the request for the example-service goes to the client by signal 8.

In step 9, the client constructs a hash of the master password, reference information to the example-service and of the e-mail address of the user to constitute a data identification for the log-in information to the example-service so that this data entry can be found and fetched from the database. The reference data is the web address to the service, i.e. www.example.com.

The client then fetches the example-service's log-in information with signals 10 and 11 by means of the data identification formed from the database and connects the user automatically to the example-service by accessing it with signals 12 and 13 by means of the log-in information fetched with signals 10 and 11.

The example-service interface is shown on the screen on the user terminal, which is indicated with signal 14. The user can now use the example-service.

Figure 3:
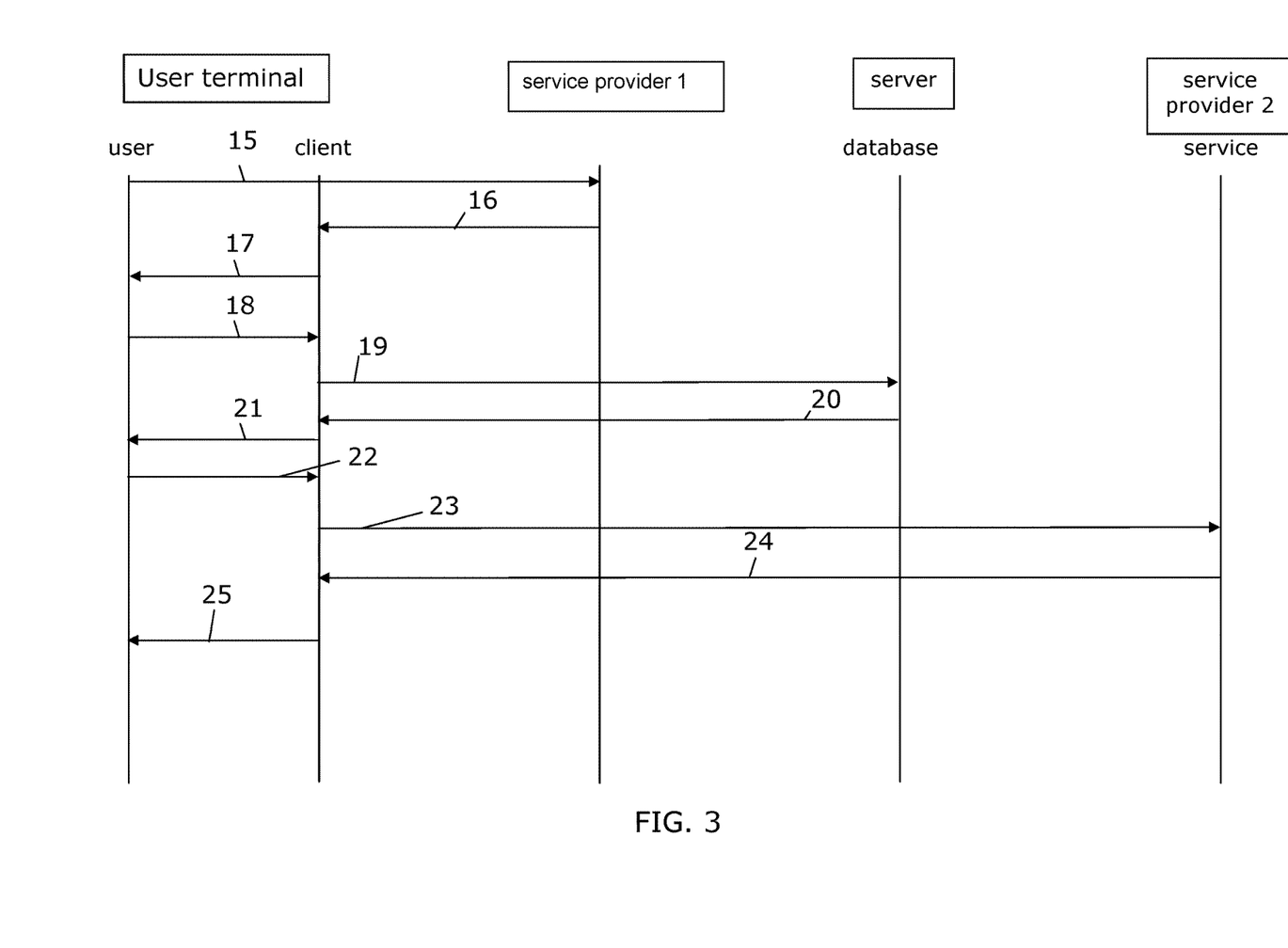
FIG. 3 is a signal diagram of a second embodiment of the method of the invention.

FIG. 3 is a signal diagram of a second embodiment of the method of the invention, wherein the user wishes to store a data entry in the database.

It is assumed that the user wants to store several data entries in the database. It is also assumed that the user already has used the client earlier in a way in accordance with FIG. 2a.

Steps 1-12, which are not shown in FIG. 3, are the same as were described for FIG. 2b. It is possible however, to make a little difference in signal 5. When in FIG. 2b, the client formed a data identification for password validation by forming a hash of the unique user name, the master password and a key to the master password (i.e. reference/identification to the master password), here in FIG. 3, instead of using an identification for the master password, just number "0" is used. The data identification for password validation can, however, also be the same as in FIG. 2b.

After that information of the entering of the log-in password to the example-service was given to the client in signal 12. the client constructs, in step 13 (not shown in FIG. 3 either) a hash of the e-mail address of the user, the master password and reference information to constitute a data identification for the log-in information to the example-service so that it can be found (the data entry=the log-in information to the example-service). The reference information, instead of being the web address to the service (that in FIG. 2b constituted reference data to the data entry), now consists of number "1". this embodiment, the data entry consists of the log-in information to the example-service like in FIG. 2b, but in addition, reference data to the data entry is included in the data entry as it is not included in the data identification. If number "0" was used in the data identification for password validation, then the data entry connected to the data identification for password validation can consist of both the master password itself or a code to it and an identification for the master password, but since this data entry only is fetched for the client, it's not necessary to include any identification for the master password in the data entry.

Like in FIG. 2b, the client then stores, by signal 14 (not shown in FIG. 3 either), the pair of the data identification and data entry in a database.

It is in FIG. 3 assumed that the user stores more log-in information to other services to the database in the same way as was done in steps 1-14 not shown in FIG. 3.

Each time, steps 1-14 are otherwise the same but the web address of the service to be requested and entered by the user in the client interface is now the web address of another service to be requested, and the log-in information is also for that other service. The difference is also that the data identification reference data now consists of number 1, 2, 3, 4, etc. respectively, each time a new data identification for a new data entry is formed. The repeating of steps 1-14 assumed to take place in FIG. 3 is not shown.

As signals 1-14 are not shown but performed, the numbering of the signals in FIG. 3 again starts by signal 15.

When the user now in FIG. 3 has used the client earlier in a way in accordance with the repeated steps 1-14 of FIG. 2b, it is now assumed that he uses a public computer to attend his services and therefore, have to perform the same steps as steps 1-4 in FIG. 2a. These steps are shown in FIG. 3 as steps 15-18.

Because of the actions performed above in steps 1-14 with the differences described above for this figure, the client validates the master password entered by signal 18 and can in addition also directly fetch a list of all data entries stored by this user.

In this embodiment, the client knows that for each user, all data identifications are constructed by a combination of the e-mail address of the user, of numbers 0-n respectively, in sequence, and the master password. The client can therefore, directly, upon the user entering the master password fetch a list of all data entries stored for the user in the database by fetching them one by one by starting from the data identification including number zero (for password validation), and thereafter by fetching a data entry by means of a data identification including number 1, 2, 3, etc.

The fetching of the list of data entries for the user is indicated by signals 19-21. The user can now just select a service from the list and directly start using the service, which is indicated by signals 22-25. Having the list in front of him on the screen, the user can any time switch to another service and start using that instead. The user can also any time add additional data entries to be stored in the database in a way described above.

In a third embodiment (not illustrated with any figure) the invention can, however, also be used for secret storing of all kinds of data entries, like PIN-codes for credit cards, reservation codes, insurance numbers, bank codes and other kind of secret or important information, information that is hard to remember, or just information that is otherwise could easily be lost or information that is annoying to administer between different devices.

The client program then uses some other reference information than a domain (web address to service) when forming the data. The reference information could be e.g. "VISA" for a PIN code to a credit card and it could be something the user can chose itself.

The second embodiment in which the reference data consisted of numbers in sequence is also very useful for the third embodiment. The user can by entering the master password get a list of all information stored in the database and get access to the data entries so that he can read them.

There is also a fourth embodiment that is useful especially in connection with the third embodiment. In a fourth embodiment, the data identification for password validation is like that in FIG. 2a. In the fourth embodiment, in one of the pairs of data identification and data entry in the database, the data entry consists of a list of references to the other data entries the data base, i.e. a kind of a table of contents. When in the third embodiment, the client fetched the list of data entries and references by combining the separate data entries after having fetched them from the data base one by one by means of characters in a logical sequence (e.g. 1, 2, 3, . . . ), the client can in this fourth embodiment fetch the whole list by means of only one search. The data identification in this pair consists of the unique user name, the master password and a key to the table of contents (=reference information to a list of data entries).

There is furthermore a fifth embodiment to be especially mentioned. It can be seen as an example implementation of a combination of the third embodiment of the invention together with either the second or fourth embodiment. In the fifth embodiment, the data entries consist of cookies and/or bookmarks of the user. It is very useful e.g in a situation, wherein the user uses a terminal other than his own for visiting his bookmarked web sites, because the invention can be used to import the same functionality to the actual terminal used. In the pair of data identification and data entry in the database, wherein the date entry consist of the whole list of cookies and/or bookmarks of the user, the data identification consist of the unique user name, the master password and a reference to the list of bookmarks and/or cookies.

In computing, a cookie (also tracking cookie, browser cookie, and HTTP cookie) is a small piece of text stored on a user's computer by a web browser. A cookie consists of one or more name-value pairs containing bits of information such as user preferences, the identifier for a server-based session, or other data used by websites. It is sent as an HTTP header by a web server to a web browser and then sent back unchanged by the browser each time it accesses that server. A cookie can be used for authenticating, session tracking (state maintenance), and remembering specific information about users, such as site preferences or the contents of their electronic shopping carts.

In the context of the World Wide Web, a bookmark is a locally stored Uniform Resource Identifier (URI). All modern web browsers include bookmark features. Bookmarks (called favorites or Internet shortcuts in the Internet Explorer browser) are normally accessed through a menu in the user's web browser.

The invention claimed is:

1. A system for managing data in a communications network, comprising:
   one or more user terminals;
   a server comprising a database; and
   a client program acting in the one or more user terminals that, when executed by the at least one user terminal, causes the one or more user terminals to:
   encrypt a master password;
   encrypt a certain data entry;
   form a data identification for the encrypted certain data entry to be stored in the database from a unique user name and the encrypted master password;
   store, in the database, a pair of the data identification and the encrypted certain data entry in the database;
   receive a log-in user name and a log-in user password;
   fetch, from the database, the encrypted master password associated with the log-in user name;
   decrypt the encrypted master password associated with the log-in user name;
   validate the log-in user password by matching the log-in user password to the decrypted master password;
   provide access to the encrypted certain data entry stored in the database, wherein the encrypted certain data entry stored in the database is otherwise inaccessible; and
   decrypt the encrypted certain data entry.

2. The system of claim 1 wherein the data identification for the certain data entry is formed from the unique user name, the encrypted master password, and reference information to the certain data entry.

3. The system of claim 2 wherein the reference information includes a Uniform Resource Locator (URL) to a service used by a user of the user terminal.

4. The system of claim 3 wherein the client program automatically connects the at least one user terminal to the service by using the master password, the unique user name and the reference to the certain data entry.

5. The system of claim 1 wherein the data identification for the certain data entry comprises a formation of a hash of the unique user name, the encrypted master password, and reference information to the certain data entry.

6. The system of claim 1 wherein the one or more user terminals have access to a service provider in the communications network, and the client program is downloadable from the service provider to any user terminal.

7. The system of claim 1 wherein the system is in a public communication network, and the database is held by a public server in the public communication network.

8. The system of claim 1 wherein the encrypted certain data entry stored in the database includes log-in information to a service used by a user of the at least one user terminal.

9. The system of claim 1 wherein a plurality of references to a plurality of data entries are related to each other in such a way that the plurality of references include information elements in a form of characters in a logical sequence.

10. The system of claim 1 wherein the certain data entry includes a list of references to a plurality of other data entries in the database, and the client program downloads one or more of the plurality of data entries, associated with a user, to the at least one user terminal.

11. The system of claim 1 wherein the data entry includes data selected from the group consisting of bookmarks and cookies.

12. The system of claim 1 wherein the unique user name is an e-mail address.

13. A computer program product for managing data in a communications network between a user terminal and a database, the computer program product comprising:
  a computer readable non-transitory storage medium; and
  program code on the non-transitory computer readable storage medium, the program code, when executed by the user terminal, causes the user terminal to:
  encrypt a master password;
  encrypt a certain data entry;
  form a data identification for the encrypted certain data entry to be stored in the database from a unique user name and the encrypted master password;
  store, in the database, a pair of the data identification and the encrypted certain data entry in the database;
  receive a log-in user name and a log-in user password;
  fetch, from the database, the encrypted master password associated with the log-in user name;
  decrypt the encrypted master password associated with the log-in user name;
  validate the log-in user password by matching the log-in user password to the decrypted master password;
  provide access to the encrypted certain data entry stored in the database, wherein the encrypted certain data entry stored in the database is otherwise inaccessible; and
  decrypt the encrypted certain data entry.

14. The computer program product of claim 13 wherein the data identification for the certain data entry is formed from the unique user name, the encrypted master password, and reference information to the certain data entry.

15. The computer program product of claim 14 wherein the reference information includes a URL to a service used by a user of the user terminal.

16. The computer program product of claim 15 wherein the program code further causes the one or more processors to automatically connect the user terminal to the service by using the master password, the unique user name and the reference to the certain data entry.

17. The computer program product of claim 13 wherein the data identification for the certain data entry comprises a formation of a hash of the unique user name, the encrypted master password, and reference information to the certain data entry.

18. The computer program product of claim 13 wherein the certain data entry includes log-in information to a service used by a user of the user terminal.

19. The computer program product of claim 13 wherein a plurality of references to a plurality of data entries are related to each other in such a way that the plurality of references include information elements in a form of characters in a logical sequence.

20. The computer program product of claim 13 wherein the certain data entry includes a list of references to a plurality of other data entries in the database, and the program code further causes the user terminal to download one or more of the plurality of data entries, associated with a user.

21. The computer program product of claim 19 wherein the data entry includes data selected from the group consisting of bookmarks and cookies.

22. The computer program product of claim 13 wherein the unique user name is an e-mail address.

23. A method for managing data in a communications network comprising one or more user terminals, a client program acting in the one or more user terminals providing access for the one or more user terminals to data, and a database in a server, the method comprising:
  encrypting, by the at least one user terminal, a master password;
  encrypting, by the at least one user terminal, a certain data entry;
  forming, by the at least one user terminal, a data identification for the encrypted certain data entry to be stored in the database from a unique user name and the encrypted master password;
  storing, by the at least one user terminal in the database, a pair of the data identification and the encrypted certain data entry in the database;
  receiving, by the at least one user terminal, a log-in user name and a log-in user password;
  fetching, by the at least one user terminal from the database, the encrypted master password associated with the log-in user name;
  decrypting, by the at least one user terminal, the encrypted master password associated with the log-in user name;
  validating, by the at least one user terminal, the log-in user password by matching the log-in user password to the decrypted master password;
  providing access by the at least one user terminal, to the encrypted certain data entry stored in the database wherein the encrypted certain data entry stored in the database is otherwise inaccessible; and
  decrypting, by the at least one user terminal, the encrypted certain data entry.

24. The method of claim 23 wherein the data identification for the certain data entry is based on the unique user name, the encrypted master password, and reference information to the certain data entry.

25. The method of claim 24 wherein the reference information includes a URL to a service used by a user of the user terminal.

26. The method of claim 23 wherein the data identification for the certain data entry comprises a formation of a hash of the unique user name, the encrypted master password, and reference information to the certain data entry.

27. The method of claim 23 wherein the at least one user terminal has access to a service provider and the client program is downloaded from the service provider to the at least one user terminal.

28. The method of claim 23 wherein the certain data entry includes log-in information to a service used by a user of the at least one user terminal.

29. The method of claim 23 wherein a plurality of references to a plurality of data entries are related to each other in such a way that the plurality of references include information elements in a form of characters in a logical sequence.

30. The method of claim 23 wherein the certain data entry includes a list of references to a plurality of data entries in the database.

31. The method of claim 23 wherein the data entry includes data selected from the group consisting of bookmarks and cookies.

32. The method of claim 23 wherein the unique user name is an e-mail address.

* * * * *